United States Patent [19]

Huebschmann et al.

[11] 3,852,231

[45] Dec. 3, 1974

[54] HOT MELT, WATER REMOISTENABLE ADHESIVE COMPOSITION

[75] Inventors: John W. Huebschmann, Youngstown; Joseph D. Peperone, Cheektowaga, both of N.Y.

[73] Assignee: Moore Business Forms, Inc., Niagara Falls, N.Y.

[22] Filed: June 2, 1972

[21] Appl. No.: 259,193

[52] U.S. Cl. ... 260/28.5 R, 260/31.4 R, 260/33.2 R
[51] Int. Cl..... C08f 45/52, C08f 45/42, C08f 45/32
[58] Field of Search .............................. 260/28.5 R

[56] References Cited
UNITED STATES PATENTS

| | | | |
|---|---|---|---|
| 3,345,320 | 10/1967 | Uffner et al. | 260/33.4 R |
| 3,462,342 | 1/1965 | Cooper et al. | 260/874 |
| 3,519,587 | 1/1970 | Wiest et al. | 260/28.5 R |

OTHER PUBLICATIONS

The condensed Chemical Dictionary, Rheinhold Publishing Corp., 1961, Page 235, relied upon.

Handbook of Adhesives, Skeist, Rheinhold Publishing Corp., 1962, Pages 378, 379, 448, relied upon.

*Primary Examiner*—Morris Liebman
*Assistant Examiner*—S. L. Fox
*Attorney, Agent, or Firm*—Watson, Cole, Grindle & Watson

[57] ABSTRACT

A hot melt, water remoistenable adhesive composition containing a water sensitive vinyl pyrrolidone-vinyl acetate copolymer, a plasticizer material which may include two different components, one of which operates as an adhesion promoter, and a wax component selected from the group consisting of Hoechst Wax S, peat wax, lignite wax and Castorwax. The composition may also include, in its preferred form, an antioxidant, an anti-block ingredient and/or a taste improving material.

16 Claims, No Drawings

HOT MELT, WATER REMOISTENABLE ADHESIVE COMPOSITION

BACKGROUND OF THE INVENTION

1. Field of the Invention

The present invention is related to the field of adhesives and more particularly to hot melt, water remoistenable adhesive compositions.

2. Description of the Prior Art

Hot melt, water remoistenable adhesives are becoming increasingly commercially valuable because they may be applied utilizing high speed automatic equipment. Basically, hot melt, water remoistenable adhesives are so named because they comprise thermoplastic materials which are also capable of tackifying in the presence of moisture. Since the adhesives are thermoplastic they may be applied to a substrate as a hot melt. After the melted adhesives cool and solidify they may be activated by wetting.

Such adhesives facilitate mass production processes because they are thermoplastic and capable of forming a hot melt without the addition of solvents and other diluents. Accordingly, the removal of solvents, etc., is not required. The hot melt is merely applied and cooled to achieve its final commercial form.

These adhesives are extremely valuable in connection with the production of articles such as envelopes, stamps, wall coverings, adhesive labels, sealing tapes, and the like. Such articles are normally provided with a solid adhesive capable of being activated by water to achieve a state of tackification whereby the article may be bonded to another surface upon being brought into contact therewith.

It is known in the art relating to hot melt, water remoistenable adhesives that certain basic properties are desirable in a commercial product. Among such desirable basic properties are that the adhesive should: (1) have excellent adhesion to substrates of the type utilized with this type of adhesive; (2) be capable of quickly developing tack after being moistened; (3) have little or no taste; (4) be highly resistant to blocking and in this regard commercial products should preferably be capable of resisting relative humidities as high as 80% without adhering to adjacent surfaces; (5) be capable of withstanding exposure to its melting temperature for long periods of time, such as, for example 100 hours to facilitate commercial production processes; (6) have as light a color as possible; (7) have a viscosity as low as possible for ease of application; and (8) be capable of setting to a tack free condition as quickly as possible after being hot melt applied to prevent offset at high production speeds.

Many attempts have been made in the past to provide a hot melt, water remoistenable adhesive which possesses the maximum number of the foregoing desirable characteristics. It has been established that vinyl pyrrolidone-vinyl acetate copolymers, such as those described in United States letters Patent No. 3,345,320, issued Oct. 3, 1967, have excellent properties for use in connection with hot melt, water remoistenable adhesives. On the other hand it is also known that suitable commercial properties can be obtained, in adhesives which utilize such a copolymer, generally only through the use of appropriate added ingredients often categorized very generally as "plasticizers." Many such additives are disclosed in said patent. Other additives for hot melt, water remoistenable adhesives based on vinyl pyrrolidone-vinyl acetate copolymers are disclosed in United States letters Patent No. 3,462,342 issued Aug. 19, 1969. While these aforementioned prior art references disclose apparently operable adhesives, neither discloses a product which possesses all of the characteristics necessary or desirable to a completely commercially valuable composition.

SUMMARY OF THE INVENTION

The principal and primary object of the present invention is to provide a hot melt, water remoistenable adhesive composition which possesses the maximum properties necessary and desirable in a commercial product. Such object is achieved through the provision of such a composition which consists essentially of an admixture of: (a) 30 to 60 parts by weight of a water sensitive, vinyl pyrrolidone-vinyl acetate copolymer wherein the weight ratio of the vinyl pyrrolidone moiety to the vinyl acetate moiety is between about 3:1 and 1:3; (b) 10 to 55 parts by weight of a plasticizer material therefor; and as an additional component, (c) 10 to 40 parts by weight of a wax component selected from the group consisting of Hoechst Wax S, peat wax, lignite wax and Castorwax. In its preferred form, the plasticizer material includes a mixture of 0 to 15 parts by weight of an adhesion promoter and 10 to 40 parts by weight of a different plasticizer component. Polyethylene glycols are preferred adhesion promoters while glycerol tribenzoate and dipropylene glycol dibenzoate are the preferred different plasticizer components. Accordingly, in their preferred form, the hot melt, water remoistenable adhesive compositions of the present invention consist essentially of a water sensitive vinyl pyrrolidone-vinyl acetate copolymer, a polyethylene glycol adhesion promoter, a glycerol tribenzoate or dipropylene glycol dibenzoate plasticizer component and a wax component selected from the group consisting of Hoechst Wax S, peat wax, lignite wax and Castorwax. The wax component is believed to be the critical component in the formulation which provides fast setting characteristics, lower viscosity when melted, and non-blocking characteristics.

DESCRIPTION OF THE PREFERRED EMBODIMENT

The desirable characteristics of a commercially valuable hot melt, water remoistenable adhesive composition are outlined above. The present invention provides an optimum adhesive having, in large measure, all of the characteristics which are desirable and/or necessary.

Broadly, the hot melt, water remoistenable adhesive composition of the present invention includes a water sensitive vinyl pyrrolidone-vinyl acetate copolymer, a plasticizer material and a wax component. The plasticizer material may preferably comprise a two component mixture including an adhesion promoter and another different plasticizer component. Also, from a commercial standpoint, the composition should preferably include an antioxidant and an anti-blocking ingredient. In addition to the foregoing, the composition may include a taste improving component. The basic formula of the composition of the present invention is generally as follows:

| | |
|---|---|
| Polymer | 30 – 60% |
| Wax | 10 – 40% |
| Plasticizer | 10 – 40% |
| Adhesion Promoter | 5 – 15% |
| Anti-Blocking Agent | 0 – 5% |
| Antioxidant | 0 – 1% |

The basic ingredient of the hot melt, water remoistenable adhesive composition of the present invention is a vinyl pyrrolidone-vinyl acetate copolymer. Such copolymers are well known in this art and are fully described in the two patents identified above. It has been found that adhesive compositions which are operable in accordance with the present invention may be produced utilizing vinyl pyrrolidone-vinyl acetate copolymers wherein the weight ratio of the vinyl pyrrolidone moiety to the vinyl acetate moiety is between about 3:1 and 1:3. The preferred weight ratio of vinyl pyrrolidone moiety to vinyl acetate moiety is about 1:1. In their usual commercial form these polymers are available in ethanol solution containing approximately 50 percent solids. However, the ethanol is driven off during the manufacturing process and is usually not present in the final adhesive composition.

With regard to the plasticizer material in the hot melt, water remoistenable adhesive compositions of the present invention, many plasticizing materials are known in the art and most of these appear to be operable for purposes of the present invention. For example, many operable plasticizing materials are disclosed in the two United States patents referred to above.

In the present instance, it has been found preferable to utilize a two component plasticizer, one component of which is capable of promoting the adhesion characteristics of the composition. In this connection it has been found that polyethylene glycols are excellent adhesion promoters. Of course, these materials could also be classified broadly as plasticizers but they appear to specifically promote adhesion to a greater degree than most of the other known plasticizers. Polyethylene glycols of various molecular weights can be utilized; however, a polyethylene glycol having a molecular weight of approximately 4,000 is preferred. These adhesion promoters are both thermoplastic and water soluble and they do not seem to lower viscosity significantly, so in that respect they do differ somewhat from ordinary plasticizers. While operable compositions have been formulated without a specific adhesion promoter, it has been found that the adhesive bond is strengthened in formulations which include the same. Polyethylene glycols having molecular weights ranging from 500 to 20,000 appear operable for purposes of the present invention.

In the preferred embodiment which includes a two component plasticizer material, the plasticizer component in addition to the adhesion promoter could be any of the plasticizers known to those skilled in this art. For example, di- and tribenzoates, phthalates, trimellitates, polyesters, glycollates and sulfonamides may be utilized. Specific operable plasticizers include materials such as sucrose benzoate, sucrose octaacetate, diphenyl phthalate, glycerol tribenzoate and dipropylene glycol dibenzoate. The latter two plasticizers are preferred.

The primary purpose of the plasticizer component is to promote adhesion while lowering viscosity. While many of the operable plasticizers are not water soluble themselves, when combined with the polymer they help to make the same remoistenable. As indicated above, the preferred plasticizer material includes an adhesion promoter such as polyethylene glycol, which is thermoplastic and water soluble, and a plasticizer component such as glycerol tribenzoate or dipropylene glycol dibenzoate, each of which are solid plasticizers which are not water soluble.

A very important ingredient of the present hot melt, water remoistenable adhesive composition is a wax component. This ingredient is included for the purpose of making the adhesive fast setting, lowering its viscosity and improving its anti-blocking characteristics. Among the waxes found to be operative in accordance with the present invention are Hoechst Wax S, peat wax, lignite wax and Castorwax. It is not known exactly why certain waxes work and others do not, and to date, the foregoing are the only waxes which have been found to provide a successful adhesive in accordance with this invention.

Hoechst Wax S is a basic wax acid comprising montanic acid, a $C_{27}$-$C_{28}$, crystalline, completely saturated hydrocarbon monobasic fatty acid. This wax is produced by oxidizing crude montan waxes to the basic acid wax. Wax S has a melting point of 172° to 181°F and has an acid value of 135–155 measured according to ASTM D-1386/55T. The molecular weight of Wax S is in the range of from 500 to 800. Montan wax from which Hoechst Wax S is produced by oxidation, is a high melting, wax like solid obtained by distilling in steam the bitumen prepared by extracting sulfurous brown coal with benzene. The crude material melts at 81°C, has a specific gravity of 1, a saponification value of 58, an acid value of 25, and contains 15 percent which is soluble in ether. The content ash is about 0.5 percent. After oxidation and a purification, the resulting product is primarily montanic acid.

Peat wax has also been found to be operable in the hot melt, water remoistenable adhesive compositions of the present invention. Peat wax is quite similar to Wax S and is produced by extraction from peat using benzene or alcohol. Peat wax has a melting point of approximately 150°F and an acid number of about 50. Its molecular weight is generally in the range of from about 600 to 800. Peat wax, which is also sometimes referred to as mona wax, is often difficult to obtain commercially and therefore is not as preferred as Wax S.

Another operable, albeit difficult to obtain commercially, wax is known as lignite wax. This wax is obtained by extraction from lignites utilizing chloroform or benzene. Lignite wax is also quite similar to Wax S. In fact, it is believed that Wax S, peat wax and lignite wax all contain a large, if not predominant proportion, of montanic acid.

Castorwax has also been found to be operable in the compositions of the present invention. Castorwax is obtained by the controlled hydrogenation of castor oil and its principal constituent is glyceryl-tri-12-hydroxy stearate. Castorwax has a melting point of about 187°F and has an acid number of about 2. While Castorwax is operable, it does not appear to be as beneficial as Wax S, peat wax or lignite wax.

At the present time the foregoing four waxes are the only ones which have been found to be completely operable for purposes of the present invention. However, it is believed that there are other operable materials.

On the other hand, it has been established that certain waxes will not work. Paraffin and microcrystalline waxes were found to kill adhesion and in most cases were not compatible with the other components of the compositions of the present invention. Both paraffin and microcrystalline waxes are produced from crude petroleum, although by different processes. Chemically, both paraffin and microcrystalline waxes consist of saturated hydrocarbons. The molecular weight of paraffin waxes ranges from 360 to 420, while the molecular weight of microcrystalline waxes ranges from 580 to 700. Paraffin waxes have mainly straight chain molecules while microcrystalline waxes often contain many branch chains. In each instance the acid number of the wax is quite low, usually less than 1.

Other waxes which have been found to be inoperable are carnauba wax, candelilla wax and bees wax. Although these waxes contain esters of monobasic fatty acids, at the present time the attempted use thereof has not resulted in the production of a hot melt, water remoistenable adhesive composition possessing the excellent characteristics of the compositions of the present invention.

An antioxidant is also preferably included in the composition. Many antioxidant compounds for use in connection with hot melt, water remoistenable adhesive compositions based on vinyl pyrrolidone-vinyl acetate copolymers are known in the art. The materials include phenols, amines, quinones, creosols and the like. A particularly advantageous material is Naugard 445, a commercially available substituted diphenylamine. Another commercially available antioxidant material is Advestab CH-201, a complex phosphite material. A combination of these two materials has been found to be particularly effective.

Another ingredient which should preferably be included in the composition is an anti-blocking agent. The purpose of this ingredient is to prevent offset and blocking. When the adhesive is applied at high speeds as a molten fluid, some of the adhesive might offset to a piece of equipment or to the underside of another piece of paper. By adding an anti-blocking material, such offsetting may be eliminated. Moreover, at high humidities, adhesive films tend to adsorb moisture which causes the film to stick to another sheet of paper. The anti-blocking agent tends to prevent such sticking or blocking. The anti-blocking agents operable in connection with the present invention are conventional and are well known to those skilled in this art. Included among such anti-blocking agents are polyethylene, hydroxystearin, ethylene-vinyl acetate copolymers, silicones and the like. A particularly advantageous and commercially available anti-block ingredient is Malcolm Nicol P-800, a mixture of waxy amides and polymeric additives.

Another ingredient which might be advantageously utilized in connection with the present invention is urea for the purpose of promoting good taste. A small quantity of urea also tends to lower the viscosity of the composition. Dicyandiamide might also be utilized to promote improved taste.

From a production standpoint, the hot melt, water remoistenable adhesive compositions of the present invention may be prepared by any of the techniques disclosed in U.S. Pat. No. 3,345,320, referred to above. These processes include mixing of all of the ingredients in a suitable solvent followed by removal of the solvent to yield a blend of the materials. Another method of appropriately blending the materials comprises heating the basic vinyl pyrrolidone-vinyl acetate copolymer to its softening point and slowly blending the other ingredients thereto. Various methods for application of the adhesive compositions to substrates are also disclosed in U.S. Pat. No. 3,345,320.

Useful composition formulations are illustrated in the following examples:

FORMULATION NO. 1

| Component | Parts by weight |
| --- | --- |
| Vinyl pyrrolidone-vinyl acetate copolymer having a weight ratio of vinyl pyrrolidone moiety to vinyl acetate moiety of 1:1 | 50 |
| Hoechst Wax S | 20 |
| Glycerol tribenzoate Plasticizer | 25 |
| Polyethylene glycol (MW = 4,000) Adhesion Promoter | 3.8 |
| Malcolm Nicol P-800 Anti-Blocking Agent | 1 |
| Naugard 445 substituted diphenylamine Antioxidant | 0.2 |

FORMULATION NO. 2

| Component | Parts by Weight |
| --- | --- |
| Vinyl pyrrolidone-vinyl acetate copolymer having a weight ratio of vinyl pyrrolidone moiety to vinyl acetate moiety of 2:1 | 50 |
| Hoechst Wax S | 20 |
| Glycerol tribenzoate Plasticizer | 25 |
| Polyethylene glycol (MW = 4,000) Adhesion Promoter | 3.8 |
| Malcolm Nicol P-800 Anti-Blocking Agent | 1 |
| Naugard 445 substituted diphenylamine Antioxidant | 0.2 |

FORMULATION NO. 3

| Component | Parts by Weight |
| --- | --- |
| Vinyl pyrrolidone-vinyl acetate copolymer having a weight ratio of vinyl pyrrolidone moiety to vinyl acetate moiety of 1:2 | 50 |
| Hoechst Wax S | 20 |
| Glycerol tribenzoate Plasticizer | 25 |
| Polyethylene glycol (MW = 4,000) Adhesion Promoter | 3.8 |
| Malcolm Nicol P-800 Anti-Blocking Agent | 1 |
| Naugard 445 substituted diphenylamine Antioxidant | 0.2 |

FORMULATION NO. 4

| Component | Parts by Weight |
| --- | --- |
| Vinyl pyrrolidone-vinyl acetate copolymer having a weight ratio of vinyl pyrrolidone moiety to vinyl acetate moiety of 1:1 | 44.8 |
| Hoechst Wax S | 25 |
| Glycerol tribenzoate Plasticizer | 25 |
| Polyethylene glycol (MW = 4,000) Adhesion Promoter | 5 |
| Naugard 445 substituted diphenylamine Antioxidant | 0.2 |

FORMULATION NO. 5

| Component | Parts by Weight |
| --- | --- |
| Vinyl pyrrolidone-vinyl acetate copolymer having a weight ratio of vinyl pyrrolidone moiety to vinyl acetate moiety of 1:1 | 40 |
| Hoechst Wax S | 18 |
| Glycerol tribenzoate Plasticizer | 40 |
| Polyethylene glycol (MW = 4,000) Adhesion Promoter | 1 |
| Malcolm Nicol P-800 Anti-Blocking Agent | 0.8 |
| Naugard 445 substituted diphenylamine Antioxidant | 0.2 |

FORMULATION NO. 6

| Component | Parts by Weight |
| --- | --- |
| Vinyl pyrrolidone-vinyl acetate copolymer having a weight ratio of vinyl pyrrolidone moiety to vinyl acetate moiety of 1:1 | 60 |
| Hoechst Wax S | 15 |
| Dipropylene glycol dibenzoate Plasticizer | 24 |
| Malcolm Nicol P-800 Anti-Blocking Agent | 0.8 |

-Continued

FORMULATION NO. 1

| Component | Parts by weight |
|---|---|
| Naugard 445 substituted diphenyl-amine Antioxidant | 0.2 |

FORMULATION NO. 7

| Component | Parts by Weight |
|---|---|
| Vinyl pyrrolidone-vinyl acetate copolymer having a weight ratio of vinyl pyrrolidone moiety to vinyl acetate moiety of 1:1 | 47 |
| Hoechst Wax S | 27 |
| Dipropylene glycol dibenzoate Plasticizer | 13 |
| Polyethylene glycol (MW = 4,000) Adhesion Promoter | 12 |
| Malcolm Nicol P-800 Anti-Blocking Agent | 0.8 |
| Naugard 445 substituted diphenyl-amine Antioxidant | 0.2 |

The foregoing formulations are all examples of compositions which have been prepared in accordance with the present invention and accordingly include a wax component and a plasticizer. For comparative purposes, the following two formulations have been prepared without the inclusion of the wax component:

FORMULATION NO. 8

| Component | Parts by Weight |
|---|---|
| Vinyl pyrrolidone-vinyl acetate copolymer having a weight ratio of vinyl pyrrolidone moiety to vinyl acetate moiety of 1:1 | 55 |
| Glycerol tribenzoate Plasticizer | 33.8 |
| Polyethylene glycol (MW = 4,000) Adhesion Promoter | 10 |
| Malcolm Nicol P-800 Anti-Blocking Agent | 1 |
| Naugard 445 substituted diphenyl-amine Antioxidant | 0.2 |

FORMULATION NO. 9

| Component | Parts by Weight |
|---|---|
| Vinyl pyrrolidone-vinyl acetate copolymer having a weight ratio of vinyl pyrrolidone moiety to vinyl acetate moiety of 1:1 | 50 |
| Glycerol tribenzoate Plasticizer | 39.8 |
| Polyethylene glycol (MW = 4,000) Adhesion Promoter | 7 |
| Malcolm Nicol P-800 Anti-Blocking Agent | 3 |
| Naugard 445 substituted diphenyl-amine Antioxidant | 0.2 |

In Table I below, the above formulations have been evaluated on the basis of performance for purposes of hot melt, water remoistenable adhesive compositions.

In interpreting the above Table, the various properties are defined as follows:

| | |
|---|---|
| Viscosity | Measured in centipoises on a Brookfield Thermosel Unit; |
| Setting Time | Time in seconds for a 0.001" thick film to become tack free after being applied to a sheet of paper; |
| Heat Stability | Composition is conditioned at 300°F in an open container, after which viscosity is remeasured and color and skin formation are observed; |
| Blocking | Composition is conditioned at 85% relative humidity and 73°F for 24 hours after which the amount of fiber tear resulting from the application of a 1 psi load is observed; |
| Tack Time | Time in seconds for the film to become tacky after being wet with water; |
| Time to Bond | Time necessary to develop fiber tearing bond after being wet with water; |
| Adhesion | Amount of fiber tear after being bonded for 24 hours. |

It can be seen from Table I that the absence of the wax component results in a tremendous increase in the time required for the composition to set (Setting Time). Also, in Formulation No. 8, the absence of the wax component apparently increased the blocking tendencies of the adhesive composition.

A particularly preferred hot melt, water remoistenable adhesive composition is set forth in the following example:

FORMULATION NO. 10

| Component | Parts by Weight |
|---|---|
| Vinyl pyrrolidone-vinyl acetate copolymer having a weight ratio of vinyl pyrrolidone moiety to vinyl acetate moiety of 1:1 | 43.0 |
| Hoechst Wax S | 21.5 |
| Glycerol tribenzoate Plasticizer | 21.5 |
| Polyethylene glycol (MW = 4,000) Adhesion Promoter | 8.5 |
| Malcolm Nicol P-800 Anti-Blocking Agent | 4.0 |
| Urea (as a Taste Improver) | 1.0 |
| Naugard 445 substituted diphenyl-amine Antioxidant | 0.25 |

TABLE I

REMOISTENABLE ADHESIVE COMPOSITIONS

| Raw Materials | Formulation Numbers | | | | | | | | |
|---|---|---|---|---|---|---|---|---|---|
| | 1 | 2 | 3 | 4 | 5 | 6 | 7 | 8 | 9 |
| PVP/VA 1:1 ratio | 50 | — | — | 44.8 | 40 | 60 | 47 | 55 | 50 |
| PVP/VA 2:1 ratio | — | 50 | — | — | — | — | — | — | — |
| PVP/VA 1:2 ratio | — | — | 50 | — | — | — | — | — | — |
| Wax Component | 20 | 20 | 20 | 25 | 18 | 15 | 27 | — | — |
| Plasticizer Component | 25 | 25 | 25 | 25 | 40 | 24 | 13 | 33.8 | 39.8 |
| Adhesion Promoter | 3.8 | 3.8 | 3.8 | 5 | 1 | — | 12 | 10 | 7 |
| Anti-Blocking Agent | 1 | 1 | 1 | — | 0.8 | 0.8 | 0.8 | 1 | 3 |
| Antioxidant | 0.2 | 0.2 | 0.2 | 0.2 | 0.2 | 0.2 | 0.2 | 0.2 | 0.2 |
| Properties | | | | | | | | | |
| Viscosity-300°F cps. | 2000 | 4500 | 1000 | 1100 | 1500 | 3500 | 1800 | 2500 | 2200 |
| Setting time-sec. | <1 | <1 | <1 | <1 | <1 | <1 | <1 | <60 | <40 |
| Heat stability – 100 hrs. at 300°F. | No Change | No Change | No Change | No Change | No Change | No Change | No Change | No Change | No Change |
| Blocking 85% RH at 73°F. | None | None | None | None | None | None | None | Yes | None |
| Remoistenability | | | | | | | | | |
| Tack time – sec. | 5 | 10 | 3 | 6 | 5 | 8 | 7 | 2 | 10 |
| Time to set – min. | 1 | 2 | 1 | 1.5 | 1.8 | 1.4 | 1.2 | 1 | 2 |
| Adhesion – % | 100 | 100 | 100 | 100 | 100 | 100 | 100 | 100 | 25 |

-Continued

FORMULATION NO. 10

| Component | Parts by Weight |
|---|---|
| Advestab CH-201 Complex Phosphite Antioxidant | 0.25 |

Other formulations which have been found to be operable are set forth below to illustrate various combinations possible in accordance with the present invention:

FORMULATION NO. 11

| Component | Parts by Weight |
|---|---|
| Vinyl pyrrolidone-vinyl acetate copolymer having a weight ratio of vinyl pyrrolidone moiety to vinyl acetate moiety of 1:1 | 45.0 |
| Hoechst Wax S | 27.5 |
| Dipropylene glycol dibenzoate Plasticizer | 13.5 |
| Polyethylene glycol (MW = 4,000) Adhesion Promoter | 13.5 |

FORMULATION NO. 12

| Component | Parts by Weight |
|---|---|
| Vinyl pyrrolidone-vinyl acetate copolymer having a weight ratio of vinyl pyrrolidone moiety to vinyl acetate moiety of 1:1 | 47.4 |
| Castorwax | 23.8 |
| Diphenyl phthalate Plasticizer | 23.8 |
| Glyercol tribenzoate Plasticizer | 4.8 |
| Naugard 445 substituted diphenyl-amine Antioxidant | 0.2 |

FORMULATION NO. 13

| Component | Parts by Weight |
|---|---|
| Vinyl pyrrolidone-vinyl acetate copolymer having a weight ratio of vinyl pyrrolidone moiety to vinyl acetate moiety of 1:1 | 46.0 |
| Dipropylene glycol dibenzoate Plasticizer | 18.0 |
| Sucrose benzoate Plasticizer | 18.0 |
| Castorwax | 18.0 |

FORMULATION NO. 14

| Component | Parts by Weight |
|---|---|
| Vinyl pyrrolidone-vinyl acetate copolymer having a weight ratio of vinyl pyrrolidone moiety to vinyl acetate moiety of 1:1 | 40.0 |
| Diphenyl phthalate Plasticizer | 40.0 |
| Sucrose benzoate Plasticizer | 5.0 |
| Castorwax | 2.0 |
| Polyethylene glycol Adhesion Promoter | 12.7 |

The hot melt, water remoistenable adhesive compositions formulated in accordance with the present invention are characterized by good adhesion; development of quick tack after contact with water; bland taste; resistance to blocking; heat stability; light color; low viscosity; and practically instantaneous set after hot melt application. Further, the compositions formulated in accordance with this invention have a high degree of resistance to absorption of moisture from the surrounding atmosphere. Accordingly, the formulations of the present invention are capable of withstanding relative humidities up to the 85 to 90 percent range without experiencing substantial blocking. Prior to the present invention, resistance to 50 percent relative humidity without blocking was considered commercially acceptable.

We claim:

1. A hot-melt, water remoistenable adhesive composition consisting essentially of an admixture of:
   a. 30 to 60 parts by weight of a water sensitive vinyl pyrrolidone-vinyl acetate copolymer wherein the weight ratio of the vinyl pyrrolidone moiety to the vinyl acetate moiety is between about 3:1 and 1:3;
   b. 10 to 55 parts by weight of a plasticizer material therefor, and as an additional component,
   c. 10 to 40 parts by weight of a wax component selected from the group consisting of Hoechst Wax S, peat wax and lignite wax.

2. A composition as set forth in claim 1 wherein said plasticizer material comprises a mixture of 0 to 15 parts by weight of an adhesion promoter and 10 to 40 parts by weight of a different plasticizer component.

3. A composition as set forth in claim 2 wherein said adhesion promoter is a polyethylene glycol and said plasticizer component is glycerol tribenzoate.

4. A composition as set forth in claim 2 wherein said adhesion promoter is a polyethylene glycol and said plasticizer component is dipropylene glycol dibenzoate.

5. A composition as set forth in claim 3 having the following formulation:

| | |
|---|---|
| vinyl pyrrolidone-vinyl acetate copolymer | 43 parts |
| Hoechst Wax S | 21.5 parts |
| glycerol tribenzoate | 21.5 parts |
| polyethylene glycol (MW = 4,000) | 8.5 parts |

6. A composition as set forth in claim 4 having the following formulation:

| | |
|---|---|
| vinyl pyrrolidone-vinyl acetate copolymer | 45 parts |
| Hoechst Wax S | 27.5 parts |
| dipropylene glycol dibenzoate | 13.5 parts |
| polyethylene glycol (MW = 4,000) | 13.5 parts |

7. A composition as set forth in claim 3 having the following formulation:

| | |
|---|---|
| vinyl pyrrolidone-vinyl acetate copolymer | 50 parts |
| Hoechst Wax S | 20 parts |
| glycerol tribenzoate | 25 parts |
| polyethylene glycol (MW = 4,000) | 3.8 parts |

8. A composition as set forth in claim 1 having the following formulation:

| | |
|---|---|
| vinyl pyrrolidone-vinyl acetate copolymer | 60 parts |
| Hoechst Wax S | 15 parts |
| glycerol tribenzoate | 24 parts |

9. A composition as set forth in claim 3 having the following formulation:

| | |
|---|---|
| vinyl pyrrolidone-vinyl acetate copolymer | 40 parts |
| Hoechst Wax S | 18 parts |
| glycerol tribenzoate | 40 parts |
| polyethylene glycol (MW = 4,000) | 1 part |

10. A composition as set forth in claim 1 wherein is also included 0 to 1 parts by weight of an antioxidant and 0 to 5 parts by weight of an anti-blocking ingredient.

11. A composition as set forth in claim 1 wherein the weight ratio of the vinyl pyrrolidone moiety to the vinyl acetate moiety in the copolymer is approximately 1:1.

12. A composition as set forth in claim 11 having the following formulation:

| | |
|---|---|
| vinyl pyrrolidone-vinyl acetate copolymer | 43 parts |
| Hoechst Wax S | 21.5 parts |
| glycerol tribenzoate | 21.5 parts |
| polyethylene glycol (MW = 4,000) | 8.5 parts |

13. A composition as set forth in claim 11 having the following formulation:

| | |
|---|---|
| vinyl pyrrolidone-vinyl acetate copolymer | 45 parts |
| Hoechst Wax S | 27.5 parts |
| dipropylene glycol dibenzoate | 13.5 parts |
| polyethylene glycol (MW = 4,000) | 13.5 parts |

14. A composition as set forth in calim 11 having the following formulation:

| | |
|---|---|
| vinyl pyrrolidone-vinyl acetate copolymer | 50 parts |
| Hoechst Wax S | 20 parts |
| glycerol tribenzoate | 25 parts |
| polyethylene glycol (MW = 4,000) | 3.8 parts |

15. A composition as set forth in claim 11 having the following formulation:

| | |
|---|---|
| vinyl pyrrolidone-vinyl acetate copolymer | 60 parts |
| Hoechst Wax S | 15 parts |
| glycerol tribenzoate | 24 parts |

16. A composition as set forth in claim 11 having the following formulation:

| | |
|---|---|
| vinyl pyrrolidone-vinyl acetate copolymer | 40 parts |
| Hoechst Wax S | 18 parts |
| glycerol tribenzoate | 40 parts |
| polyethylene glycol (MW = 4,000) | 1 part |

* * * * *